May 12, 1959  N. MONTANINO  2,886,367
SAFETY LOADING DEVICE
Filed July 26, 1955  2 Sheets-Sheet 1
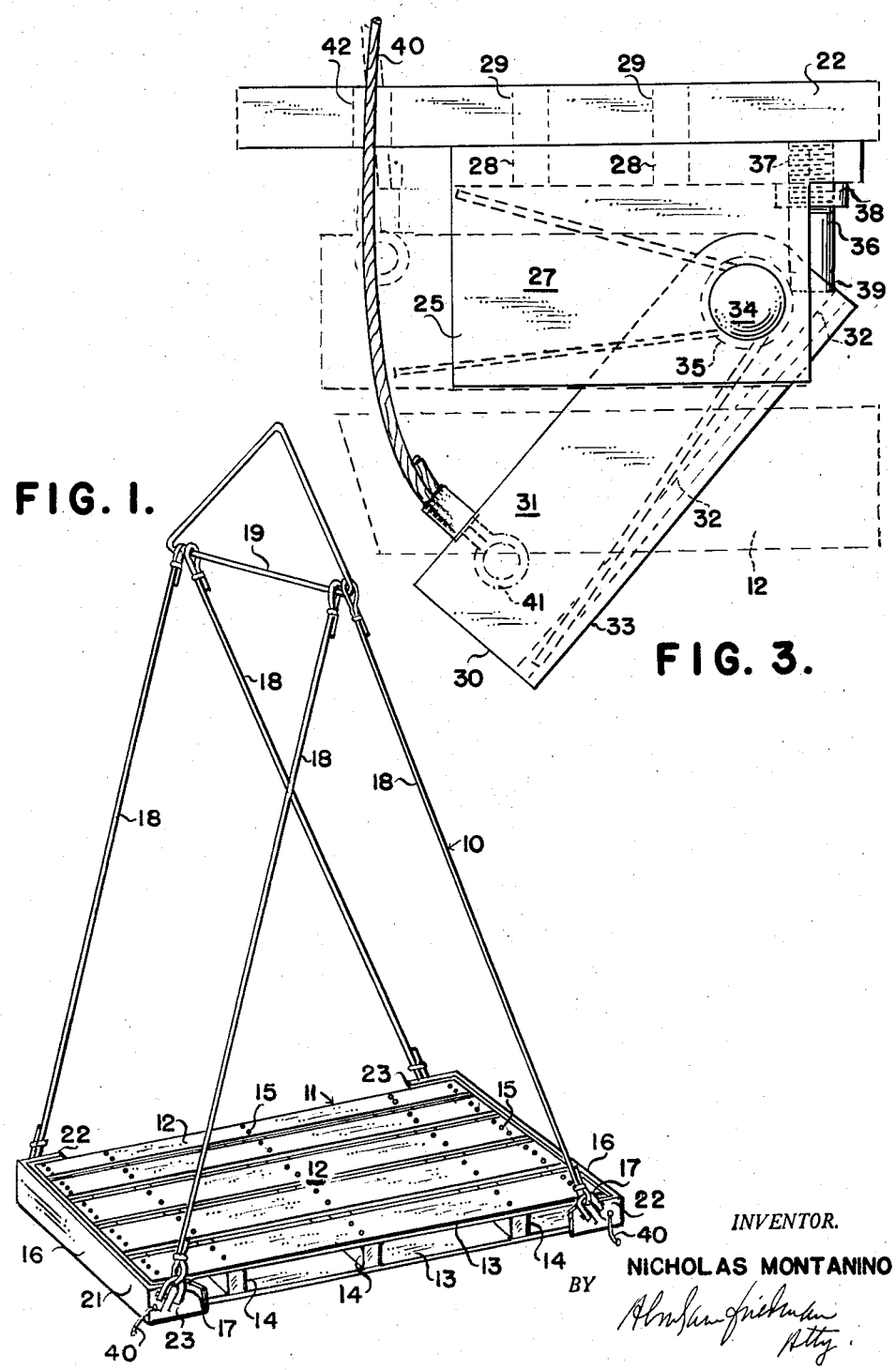
INVENTOR.
NICHOLAS MONTANINO
BY May 12, 1959      N. MONTANINO      2,886,367

SAFETY LOADING DEVICE

Filed July 26, 1955      2 Sheets-Sheet 2

INVENTOR.
NICHOLAS MONTANINO
BY

United States Patent Office 2,886,367
Patented May 12, 1959

2,886,367

SAFETY LOADING DEVICE

Nicholas Montanino, Springfield, N.J.

Application July 26, 1955, Serial No. 524,444

4 Claims. (Cl. 294—67)

This invention relates to cargo loading and unloading apparatus and more particularly to a safety locking device for use in loading and unloading pallets.

In the loading and unloading of cargo on vessels and the like it is customary to stack the cargo on box-type pallets. Scoops are then inserted under the pallet along each of the ends thereof, a suitable bridle or sling being attached to the scoops whereby the entire assembly may be raised or lowered by suitable devices as required in the loading or unloading operation. However, arrangements of this type present serious hazards to the safety of the personnel engaged in the operation as well as to the cargo itself in that it often happens that the scoop becomes disengaged from the pallet thereby precipitating the pallet and its cargo and causing serous injuries to the personnel in the vicinity of the sling. The operation is particularly hazardous to personnel below the sling as would be the case of cargo being lowered into the hold of a vessel or the like. Although some arrangements have been proposed for positively locking the pallet to its suspending device, such arrangements have involved complex and costly structures requiring the replacement of presently used scoops and similar devices and have been cumbersome to operate. The device comprising the present invention obviates the shortcomings of prior proposed devices.

It is therefore an object of this invention to provide a safety locking device which is adapted to be mounted upon existing types of pallet supporting scoops without material modification of the scoop structure, which locking device is adapted to engage with a portion of a box-type pallet being loaded in such manner as to positively lock the pallet to the scoop against disengagement during the loading operation.

Another object of this invention is to provide a simple locking latch arrangement which is readily adapted to be mounted upon existing pallet scoop structures and which will automatically interlock the scoop with the pallet to be raised by following conventional loading procedures and which does not require the loader to manipulate the lock during such operation.

A further object of this invention is to provide a device for interlocking a scoop with a box-type pallet so as to prevent the disengagement of the pallet from the scoop during any step of the loading operation and which will remain in locked condition in spite of mishandling of the load or other unforeseen exigencies which may be encountered during the loading operation.

It is also an object of this invention to provide a locking device of the character heretofore indicated which requires positive manipulation in order to disengage a scoop from a supported pallet and in which the release arrangement is such as to prevent the accidental opening thereof during manipulation of the cargo.

Other and further objects of this invention will become apparent from the description thereof contained in the annexed specification and claims or will otherwise be obvious.

In the drawings:

Figure 1 is a perspective view of a pallet supported by a pair of scoops and associated bridle, in accordance with the present invention;

Figure 3 is a plan view of the locking device in accordance with the present invention, similar to the view of Figure 2 and indicating the retracted position of the locking finger in broken lines.

Figure 4:
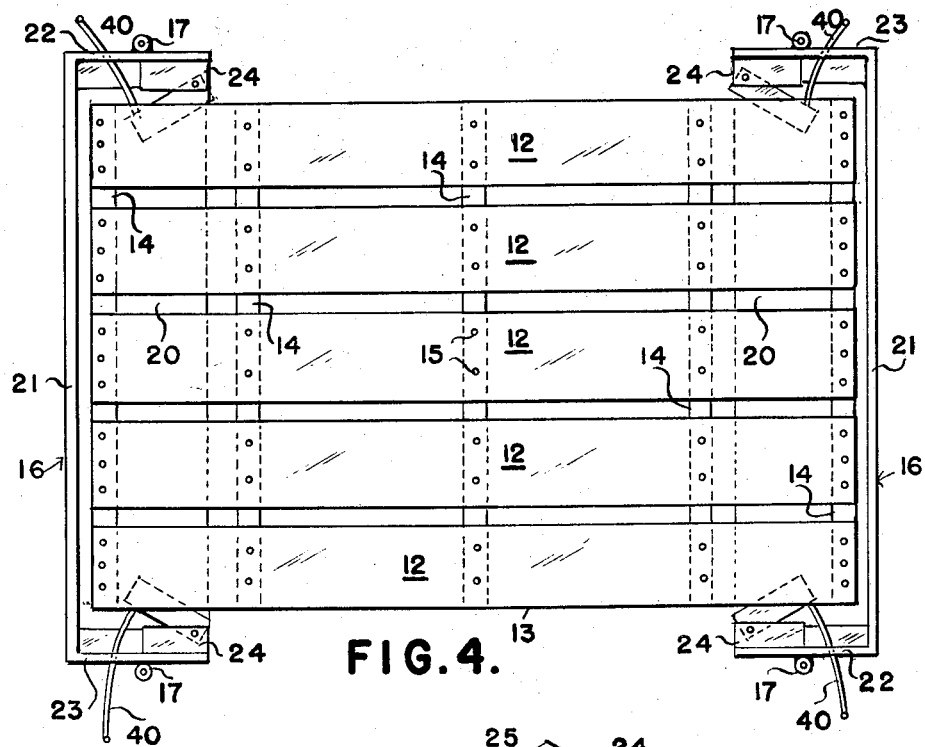
Figure 4 is a plan view of a scoop supported pallet showing the locking device comprising the present invention mounted at the corners of the scoops.

Figure 1 illustrates a conventional form of sling or bridle arrangement 10 for supporting a box-type pallet 11. A pallet of this type comprises a series of longitudinally extending boards 12 which form the floors 13 of the pallet. The floor boards 12 are secured to transversely extending stringers or braces 14 by means of nails, screws or bolts 15. The pallet 11 is supported at its ends by means of scoops 16. Scoops 16 are provided with attaching devices such as shackles 17 which in turn are secured to bridle or sling cables 18. Cables 18 converge toward each other along each side of the scoops and are usually connected to and supported by a spreader 19 which is adapted to be engaged by the hook or grappling device of a hoist or crane, not shown. In a conventional arrangement of this type the scoops are retained in position at the ends of the pellet by the friction between the scoop and the pallet surfaces. It will be obvious that there are many circumstances under which the scoop can be accidentally disengaged from the pallet during the hoisting operation, as for example, if the lifting assembly should suddenly strike an object while in mid air or if one corner or end should accidentally be caught on some projection, or if the sling cables 18 should in anywise be caught, tangled or disturbed.

Figure 2:
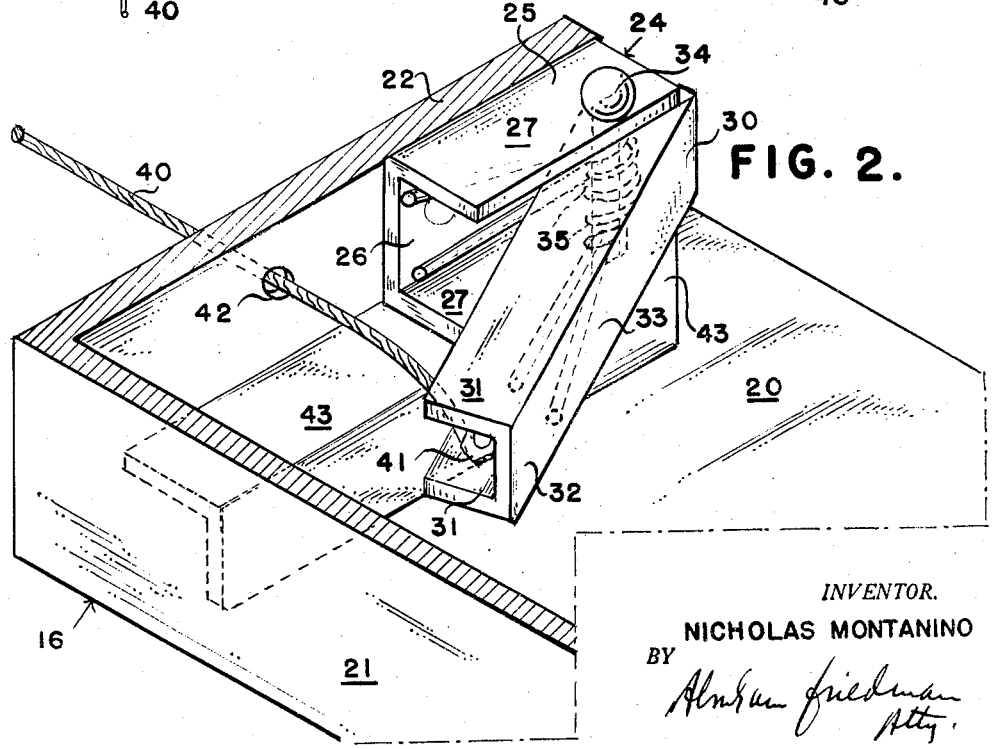
Figure 2 is a fragmentary perspective view of an enlarged scale showing the safety locking device comprising the present invention mounted in an interior corner of a pallet supporting scoop.

As may be more clearly seen from Figures 2 and 4, a conventional form of scoop 16 as now employed is formed with a horizontal bottom wall 20 which is surrounded by a vertical peripheral end wall 21 and peripheral vertical side walls 22 and 23. The scoop thus comprises a horizontal bottom supporting wall surrounded on three sides by upstanding vertical peripheral walls to thereby provide an open ended platform. In operation a pallet bearing the load is usually positioned on blocks or spacers thereby permitting the ready insertion of the bottom wall of a scoop underneath each end of the pallet.

As may be more clearly seen from Figures 2 and 4 the present invention comprises a device adapted to be attached to the interior surface of each of the side walls 22 and 23 of each of the scoops so as to lock the scoop in position against displacement from the pallet. The locking device is designated generally by the numeral 24 and comprises a channel-shaped support member 25 having a base wall or web 26 from which flanges 27 extend. Web 26 is provided with a plurality of perforations 28 as may be more clearly seen in Figure 3 which are adapted to receive fastening bolts which pass through aligned perforations 29 formed in the side wall 22 of the scoop to thereby secure the channel support member 25 in stationary position on the side wall of the scoop. A similar complementary channel member is adapted to be nested between the flanges 27 of the channel member 25 and is pivotally secured between the flanges of channel support member 25 by means of a pivot pin or pintle 34. The nested channel member comprises the latch or locking finger 30 of the device and is formed with flanges 31 which are interconnected by means of web 32 which forms an operative face plate or cam surface 33 for the locking finger as will more clearly appear hereafter. Locking finger 30 is pivotably mounted between the flanges of supporting channel 25 at its end by means of pivot pin or pintle 34. Said pintle is passed through aligned perforations formed in the flanges of support member 25 and locking finger 30. The pintle is surrounded by a pair of suitable coil springs 35, the ends of which bear against webs 26 and 32 of members 25 and 30 respectively thereby resiliently biasing locking finger 30 to its extended position as shown in Figures 2 and 3. In view of the pivotable mounting arrangement of locking finger 30, it is adapted to be pivotally moved in a plane parallel to the horizontal plane of bottom wall 20 of the scoop from its extended position shown in the full lines in Figure 3 to a retracted position shown by the broken lines of that figure. A threaded stud 36 is mounted in a complementary threaded opening 37 formed in web 26 and adjustably retained in position by means of lock nut 38. The end portion of the interior surface of web 32 abuts against the end 39 of stud 36 when the locking finger 30 is in the position indicated in Figure 2 and in the full lines of Figure 3. The stud 36 thus acts as a limit stop for the locking finger and assumes that said finger will be maintained at an acute angle with respect to the side wall of the scoop in its extended position corresponding to the locking condition of the device.

In order to enable the locking finger to be manually retracted against the biasing action of springs 35 a release cable 40 is provided. One end of said release cable is secured to the locking finger by means of bolt 41 and the free end thereof is passed through a perforation 42 in the side wall of the scoop and extends outwardly therefrom for a sufficient length to permit it to be manually grasped by an operator in order to retract the locking finger from its outwardly extended locking position to its inwardly retracted release position wherein it rests substantially parallel with the side wall of the scoop. From the foregoing it will be seen that there is thus provided a pivotably mounted locking finger on the inside of each side wall of the scoop which finger is normally resiliently biased to an extended position but which may be retracted by manual operation of a cable extending beyond the side walls of the scoop. The locking device is additionally provided with a spacer 43 which may advantageously be in the form of an angle iron and which spaces the locking finger from the bottom wall of the scoop a distance sufficient to permit the locking finger to clear the bottom floor board of the scoop. Furthermore, the spacer determines the location of the device so that in mounting the locking device on the scoop the free end of the locking finger is spaced sufficiently from end wall 21 of the scoop to permit it to clear the end brace at each end of the pallet. Similar locking devices are positioned on the interior surface of the side walls of each scoop.

In operation, as heretofore stated, in its position of rest, a pallet is usually supported on the ground by means of blocks or other spacers to provide sufficient clearance to permit the passage of the bottom wall of a scoop thereunder preparatory to lifting a cargo loaded pallet. A scoop is inserted underneath each end of the pallet. It will be noted that the distance between the locking fingers of a scoop is less than the width of the pallet and that consequently as the scoop is inserted under the pallet, the operative faces 33 of locking fingers bear against the ends of braces 14 at the ends of the pallet thereby moving the locking fingers and causing them to be retracted as the scoop is inserted by overcoming the resilient biasing action of the locking finger springs 35. As the insertion of the scoop proceeds the ends of braces 44 clear the free ends of the locking fingers thereby permitting the locking fingers to spring back into their original extended position and thus tripping the locking fingers behind said braces. The locking fingers are so dimensioned as to permit them to enter the space between the floors of the pallet. As a consequence of this, as will be more clearly seen in Figure 4, the scoop is locked in position with relation to the pallet since any attempt to withdraw the scoop from the pallet will result in the abutment of the free end of the locking finger against the rear or interior surface of the brace. As heretofore indicated the locking finger is maintained in position by means of stud 36 which acts as a limit stop. Furthermore, the locking finger is thus captured between the floors of the pallet so as to prevent the relative displacement of the pallet and scoop from each other. It will thus be apparent that the scoop cannot be disconnected from the pallet except upon the manual retraction of the locking finger by means of release cables 40. With the scoops locked to the pallet as hereinabove described the accidental dislodgement of the pallet from the scoop is completely prevented even if the load is mishandled, objects are struck or the tension upon the sling supporting the scoops is accidentally released. Furthermore, the scoop is locked to the pallet automatically in that the locking action takes place as the scoop is inserted in position in the normal manner and without the requirement of any further manual manipulation thereby eliminating the possibility of human error. The scoop and pallet remain locked until positive action is taken to manually release them from each other as when it is desired to deposit the pallet and cargo. Under such conditions personnel stationed at each side of the scoop merely draw upon the release cables and withdraw the scoop from under the pallet. It should further be noted that the release mechanism preferably comprises a flexible cable which extends from the sides of the pallet for the short distance required to permit it to be manually grasped and that being flexible the cable does not comprise any projection which may accidentally be caught upon some projection to inadvertently release the lock. From the foregoing it will be clearly apparent that a substantial increase in the safety factor of cargo handling has been accomplished by means of the foregoing locking device.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

1. In a lifting device for a box-type pallet, including a pair of scoops suspended from a lifting bridle, a locking device for preventing the accidental displacement of the pallet from the scoops, each of said scoops including a horizontal bottom wall and a vertical end and side walls and said pallet including spaced apart longitudinally extending floor boards and a plurality of transverse braces disposed between said floors along the opposing sides of which said boards are secured in parallel spaced relation, said locking device comprising a support secured to the interior surface of a side wall of the scoop, a locking finger pivotably mounted on said support for movement toward and away from said side wall at one of its ends, resilient means normally urging said locking finger pivotally away from said side wall and to extend into the interior of said scoop, stop means for limiting the angular position of said locking finger with respect to the side wall of the scoop upon which it is mounted so that it forms an acute angle with respect thereto, whereby said locking finger presents a yieldable surface projecting into the path of travel of a pallet inserted in said scoop, said locking finger being adapted to be cammed into retracted position to permit the passage of the end brace of the pallet and to spring back into extended position as said end brace clears the free end of the finger, whereby said finger presents an abutment to the rear surface of said end brace to thereby prevent the displacement of said pallet from said scoop, said locking finger being dimensioned and positioned to enter the space between the floors of said pallet.

2. The device according to claim 1 wherein means are provided for manually retracting said locking finger to thereby release said scoop from said pallet.

3. The device according to claim 1 wherein the release means comprises a flexible cable extending exteriorly of said scoop.

4. In a lifting device for a box type pallet including a pair of scoops suspended from a lifting bridle, a locking device for preventing the accidental displacement of the pallet from the scoops, each of said scoops including a horizontal bottom wall and a vertical end wall and side walls, said pallet including spaced-apart longitudinally extending floor boards and a plurality of transverse braces disposed between said floors along the opposing sides of which said floor boards are secured in parallel spaced relation, said locking device comprising a support secured to the interior surface of a side wall of the scoop, a retractible locking finger mounted on said support for movement toward and away from said side wall, resilient means normally urging said locking fingers away from said side wall to extend into the interior of said scoop, stop means for limiting the extension of said locking finger with respect to the side wall of the scoop upon which it is mounted, said locking finger being yieldably supported and projecting into the path of travel of a pallet inserted in said scoop, said locking finger having a cam surface whereby it is adapted to be cammed into retracted position by contact with the front surface of the end brace of the pallet to permit the passage of said end brace into said scoop and to spring back into extended position as said end brace clears the free end of the finger, whereby said finger presents an abutment to the rear surface of said end brace preventing the displacement of said pallet from said scoop, said locking finger being dimensioned and positioned to enter the space between the floors of said pallet.

References Cited in the file of this patent
UNITED STATES PATENTS

| | | |
|---|---|---|
| 1,224,148 | Crosby | May 1, 1917 |
| 1,582,265 | Griffin | Apr. 27, 1926 |
| 2,047,138 | Fildes | July 7, 1936 |
| 2,047,140 | Fildes | July 7, 1936 |
| 2,074,244 | Thurber | Mar. 16, 1937 |
| 2,721,756 | Markussen | Oct. 25, 1955 |